United States Patent [19]
Bednarczyk et al.

[11] Patent Number: 5,988,556
[45] Date of Patent: Nov. 23, 1999

[54] METHOD AND APPARATUS FOR WINDING FIBER ON A SPOOL

[75] Inventors: David A. Bednarczyk; Steven L. Bertz, both of Wilmington, N.C.; Sally A. Murphy, Painted Post, N.Y.

[73] Assignee: Corning Incorporated, Corning, N.Y.

[21] Appl. No.: 09/128,720

[22] Filed: Aug. 4, 1998

Related U.S. Application Data

[60] Provisional application No. 60/056,686, Aug. 22, 1997.

[51] Int. Cl.⁶ .......................... B65H 54/00; B65H 75/28; B65H 55/00
[52] U.S. Cl. .................................. 242/476.2; 242/472.6; 242/125.1; 242/597.4; 242/167; 242/920
[58] Field of Search .............................. 242/476.2, 476.4, 242/472.6, 474.8, 597.4, 920, 125.1, 166, 167, 439.5, 439.6, 440.1

[56] References Cited

U.S. PATENT DOCUMENTS

| | | |
|---|---|---|
| 3,845,913 | 11/1974 | Hagen ................................... 242/476.2 |
| 4,117,988 | 10/1978 | Moore ............................... 242/597.4 X |
| 4,158,444 | 6/1979 | Krauss . |
| 4,184,652 | 1/1980 | Rovin . |
| 4,511,095 | 4/1985 | Ideno et al. . |
| 4,667,896 | 5/1987 | Frey et al. .......................... 242/167 X |
| 4,696,438 | 9/1987 | Myers . |
| 4,948,057 | 8/1990 | Greis . |
| 5,086,983 | 2/1992 | Darrieux . |
| 5,129,593 | 7/1992 | Smith . |
| 5,228,631 | 7/1993 | Hu et al. ............................. 242/167 X |
| 5,323,479 | 6/1994 | Allen . |
| 5,362,007 | 11/1994 | Raasch . |
| 5,370,326 | 12/1994 | Webb ............................... 242/597.4 X |
| 5,393,002 | 2/1995 | Greis et al. . |

Primary Examiner—Michael R. Mansen
Attorney, Agent, or Firm—David L. Berdan; Robert L. Carlson

[57] ABSTRACT

A continuous length of fiber from a fiber supply is wound onto first and second sections of a spool by an apparatus and method that collect a first portion of the continuous length of fiber from the fiber supply, wind the collected first portion onto the first section of the spool, and wind a second portion of the continuous length of fiber onto the second section of the spool.

23 Claims, 5 Drawing Sheets

METHOD AND APPARATUS FOR WINDING FIBER ON A SPOOL

This application is based upon the provisional application Ser No. 60/056,686, filed Aug. 22, 1997, which we claim as the priority date of this application.

BACKGROUND OF THE INVENTION

1. Field of the Invention

The present invention relates to a method and apparatus for winding a continuous length of fiber onto a spool and, more particularly, to a method and apparatus for winding a continuous length of optical waveguide fiber onto first and second sections of a spool.

2. Description of the Related Art

A manufacturer of optical waveguide fiber (optical fiber) typically must dispense sections of optical fiber from a bulk spool, which contains a large amount of optical fiber, onto respective shipping spools, which are sent to customers. Both ends of the optical fiber on the shipping spool must be readily accessible for testing. Therefore, the manufacturer winds a first portion of the optical fiber onto a sample section of the shipping spool and winds the remainder of the optical fiber onto a separate, main section of the shipping spool. A conventional process for winding the optical fiber onto the sample and main sections of the shipping spool involves both manual and automatic winding steps. Specifically, at a manual winding station, an operator manually pulls a portion (typically ten meters) of the optical fiber from the bulk spool through a hole in a flange of the shipping spool and manually winds it onto the sample section of the shipping spool. The operator then transfers the shipping spool from the manual winding station to a winding apparatus, which automatically winds a desired amount of the optical fiber from the bulk spool onto the main section of the shipping spool. The operator subsequently severs the optical fiber extending between the shipping spool and the bulk spool.

The conventional process is time consuming and inefficient. For example, the manual pulling and winding steps occupy the operator's time, and the operator cannot perform the steps quickly. Furthermore, the tension in the manually-wound, optical fiber varies, and, if the operator winds the optical fiber onto the sample section too tightly, the optical fiber must be unwound and rewound. The need to transfer the shipping spool from the manual winding station to the winding apparatus further contributes to the time-consuming and inefficient nature of the conventional process.

Additionally, manual winding of the optical fiber on the sample section of the shipping spool may contribute significantly to injuries to the operator. Manual winding requires extension of the upper arm and continual rotation of the lower arm around the elbow. During a typical 12 hour shift, the operator will experience several hundred shoulder and elbow rotations per shift.

SUMMARY OF THE INVENTION

An object of the present invention is to provide a substantially automated winding method and apparatus.

Another object of the present invention is to provide a winding method and apparatus that quickly wind optical fiber on a shipping spool. Another object of the present invention is to provide a winding method and apparatus that wind a continuous length of optical fiber onto a sample section and a main section of a shipping spool such that both ends of the optical fiber are readily accessible for testing.

Yet another object of the present invention is to provide a winding method and apparatus that consistently provide a desired amount of tension in an optical fiber wound on a sample section of a shipping spool.

Additional objects and advantages of the invention will become apparent from the description which follows. Additional advantages may also be learned by practice of the invention.

In a broad aspect the invention provides a method of winding a first portion of a continuous length of fiber from a fiber supply onto an object. The method comprises the steps of preliminarily winding a first portion of the continuous length of fiber to collect the first portion from the fiber supply while a second portion of the continuous length of fiber remains at the fiber supply and winding the collected first portion onto the object while the second portion remains at the fiber supply.

In another broad aspect, the invention provides an apparatus for winding a first portion of a continuous length of fiber from a fiber supply onto an object. The apparatus comprises a reel that rotates to collect the first portion of the continuous length of fiber while a second portion of the continuous length of fiber remains at the fiber supply and a carriage that rotatably supports the reel and that causes the reel to revolve around the object to wind the collected first portion of the continuous length of fiber onto the object while the second portion remains at the fiber supply.

In another broad aspect, the invention provides a method of winding a continuous length of fiber from a fiber supply onto first and second sections of a spool. The method comprises the steps of preliminarily winding a first portion of the continuous length of fiber to collect the first portion from the fiber supply while a second portion of the continuous length of fiber remains at the fiber supply, winding the collected first portion onto the first section of the spool while the second portion remains at the fiber supply, and winding the second portion of the continuous length of fiber from the fiber supply onto the second section of the spool.

In another broad aspect, the invention provides an apparatus for winding a continuous length of fiber from a fiber supply onto first and second sections of a spool. The apparatus comprises a first device that collects a first portion of the continuous length of fiber from the fiber supply and winds the collected first portion onto the first section of the spool, and a second device that winds a second portion of the continuous length of fiber onto the second section of the spool.

It is to be understood that both the foregoing summary and the following detailed description are exemplary only and are not restrictive of the invention, as claimed.

BRIEF DESCRIPTION OF THE DRAWINGS

The invention will be described in conjunction with the accompanying drawings, which illustrate a presently preferred embodiment.

DESCRIPTION OF THE PREFERRED EMBODIMENT

Figure 1:
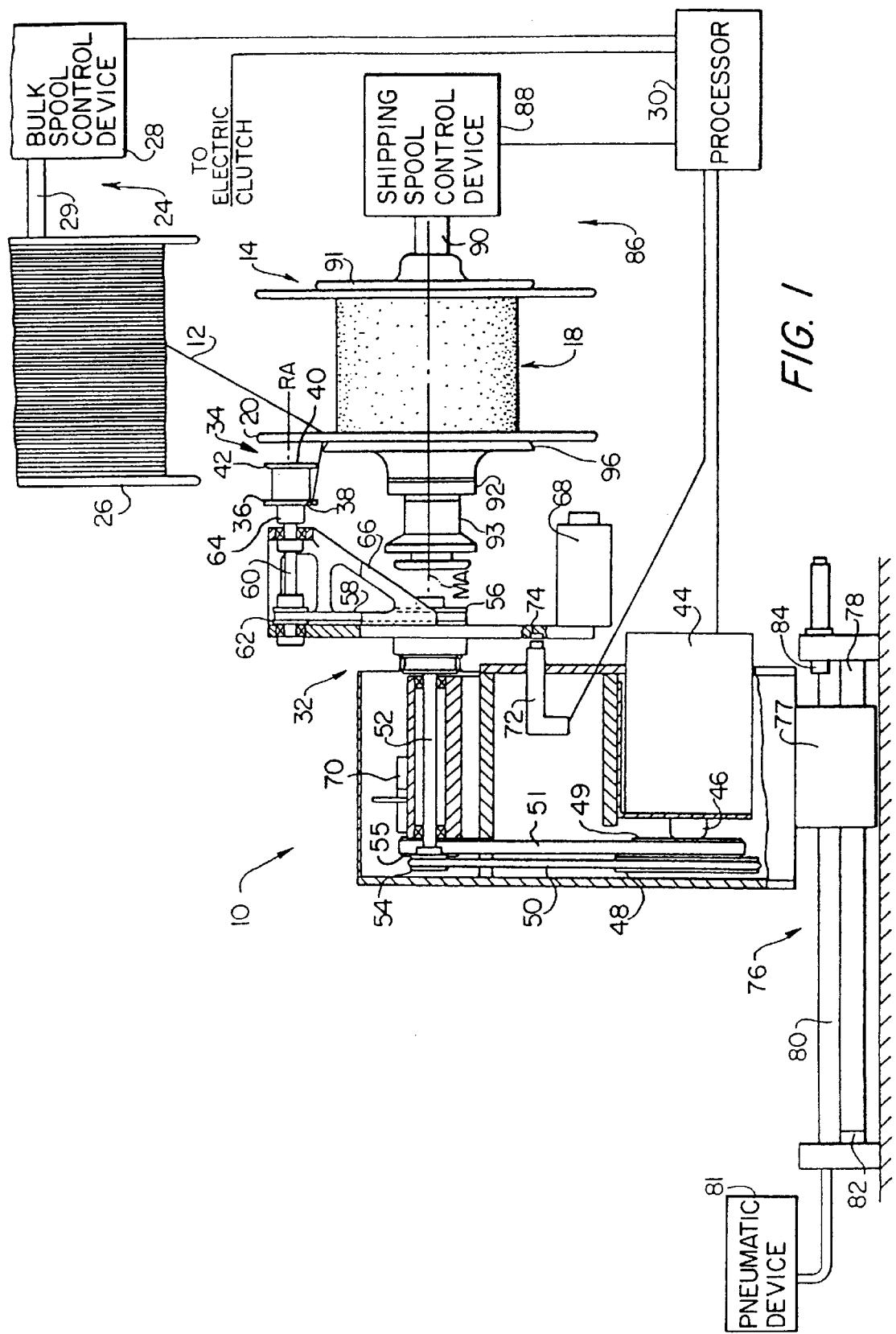
FIG. 1 is a side view of a preferred embodiment of a winding apparatus according to the present invention, showing a sample section winding device in a winding position.

Reference will now be made in detail to the preferred embodiment illustrated in the drawings.

Figure 8:
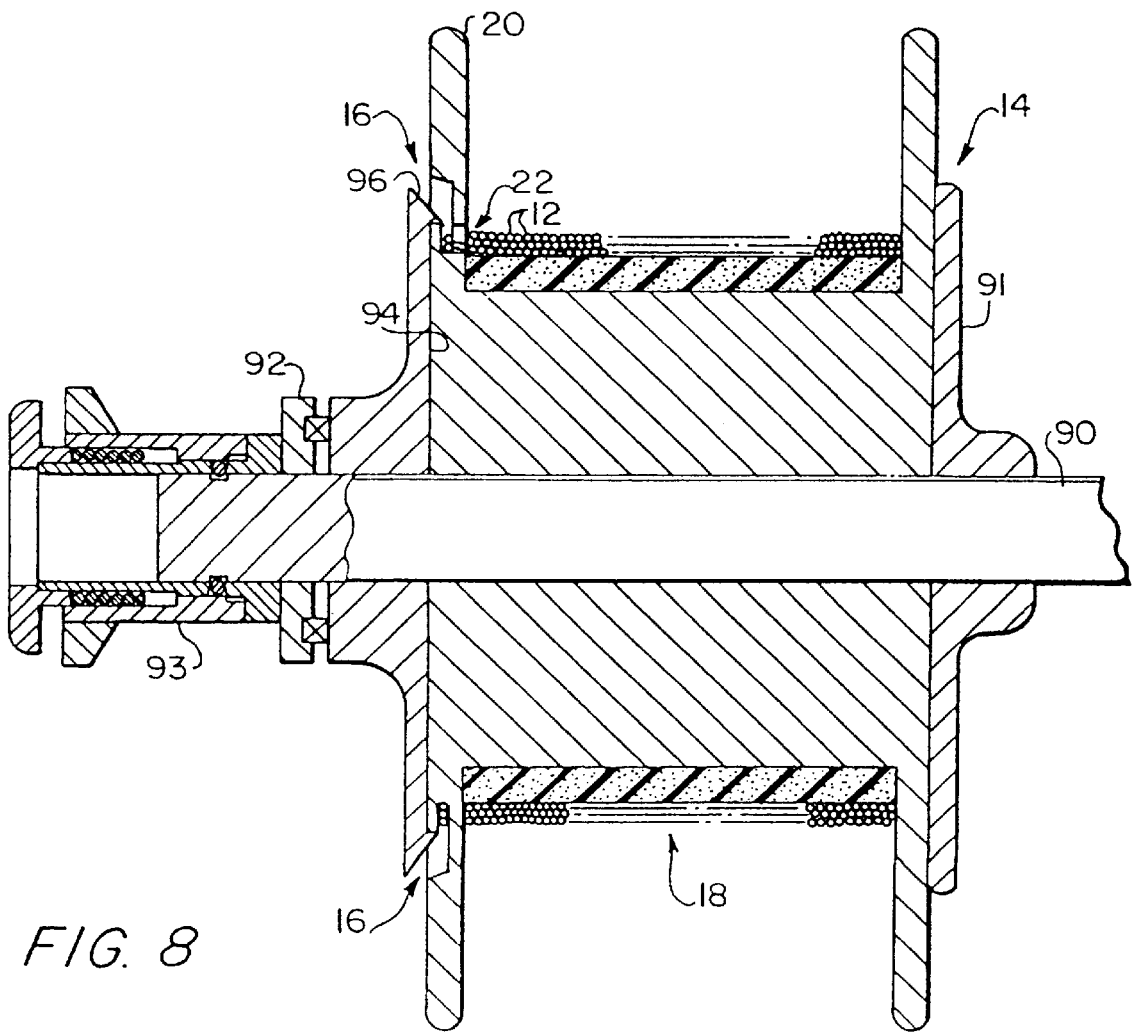
FIG. 8 is a sectional view of the spool, a shaft, and bolster plates of the winding apparatus of FIG. 1.

As shown generally in FIG. 1, a preferred winding apparatus 10 winds a continuous length of optical fiber 12 onto a shipping spool 14. As shown in FIG. 8, the shipping spool 14 has a sample (first) section 16 and a main (second) section 18. The sample section 16 is recessed in a flange 20. The flange 20 has a hole 22 that permits the continuous length of optical fiber to extend between the sample and main sections 16 and 18.

The winding apparatus 10 includes a fiber supply 24 that supplies the continuous length of optical fiber, a sample section winding device (first device) 32 that collects a minor or first portion of the continuous length of optical fiber from the fiber supply 24 and winds the collected first portion onto the sample section 16 of the shipping spool 14, and a main section winding device (second device) 86 that winds a major or second portion of the continuous length of optical fiber onto the main section 18 of the shipping spool 14.

The fiber supply 24 preferably includes a bulk spool 26, which has optical fiber wound thereon, and a bulk spool control device 28, which controls the rotation of the bulk spool 26 by controlling rotation of a shaft 29 upon which the bulk spool 26 is mounted. The fiber supply 24 may also include conventional components (not shown), such as pulleys, that tension the optical fiber and otherwise assist in the winding process. A processor 30 communicates with the bulk spool control device 28 to control the supply of optical fiber by the fiber supply 24.

Figure 7:
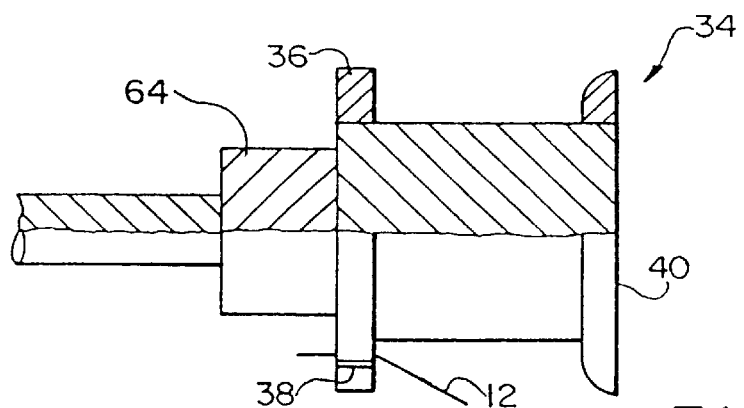
FIG. 7 is a partial sectional view of the reel of the winding apparatus of FIG. 1.

The sample section winding device 32 preferably includes a reel 34 having an elastic portion 36 with an angled slit 38, which extends substantially parallel to a rotational axis RA of the reel 34 and which is designed to grip a free end of the first portion of the continuous length of optical fiber (FIG. 7). The reel 34 also has a flange 40 with a beveled edge 42. The beveled edge 42 prevents damage to the optical fiber if it should contact the flange 40 during winding onto the reel 34.

A motor 44, which is controlled by the processor 30, rotates the reel 34 about the axis RA (FIG. 1). A power train connecting the motor 44 to the reel 34 includes a shaft 46 of the motor 44, a pulley 48 mounted on the shaft 46, a belt 50, a rotatable main shaft 52 having pulleys 54 and 56 mounted on opposite ends thereof, a belt 58, and a rotatable reel shaft 60 having a pulley 62 mounted on an end thereof. The pulleys 48, 54, 56, and 62 are all fixed on their respective shafts 46, 52, and 60 so that they do not rotate relative to the shafts.

A hysteresis slip clutch 64 (Magpower, part no. HC01-1) connects the reel shaft 60 and the reel 34. The slip clutch 64 causes the reel shaft 60 and the reel 34 to be fixed together until a torque on the reel 34 exceeds an opposing torque on the reel shaft 60 by a predetermined amount. When the predetermined amount is exceeded, the slip clutch 64 permits the reel shaft 60 and the reel 34 to rotate relative to one another. The slip clutch 64 can be adjusted to provide a predetermined amount of torque. The significance of the slip clutch 64 will be evident during the explanation of the operation of the winding apparatus 10.

A carriage 66 supports the reel 34, along with a counterweight 68. The motor 44 rotates the carriage 66 to cause the reel 34 and the counterweight 68 to revolve around an axis MA, which is also the rotational axis of the sample and main sections 16 and 18 of the shipping spool 14. The reel 34 is preferably revolved around the axis MA in a direction that causes the least amount of bending of the optical fiber extending through the hole 22 in the flange 20.

A power train connecting the motor 44 to the carriage 66 includes the shaft 46, a pulley 49 mounted on the shaft 46, a belt 51, a hollow, first clutch shaft 53 having a pulley 55 and an electric clutch 70 mounted on opposite ends thereof, a solid, second clutch shaft 57 having a pulley 59 mounted thereon, a belt 61, and a pulley 63 mounted on the carriage 66. The pulleys 49, 55, 59, and 63 are all fixed to the component upon which they are mounted so that they do not rotate relative to that component.

The processor 30 shifts the electric clutch 70 between engaged and disengaged states. When the electric clutch 70 is in the engaged state, the first clutch shaft 53 and the second clutch shaft 57 are fixed together so that power from the motor 44 can transferred to rotate the carriage 66. When the electric clutch 70 is in the disengaged state, the first clutch shaft 53 and the second clutch shaft 57 can rotate relative to one another so that the motor 44 cannot rotate the carriage 66.

A detector 72 detects each rotation of the carriage 66 and provides this information to the processor 30, which counts the number of rotations. The detector 72 preferably comprises a proximity sensor that senses each pass of a metal screw 74 on the carriage 66.

Figure 5:
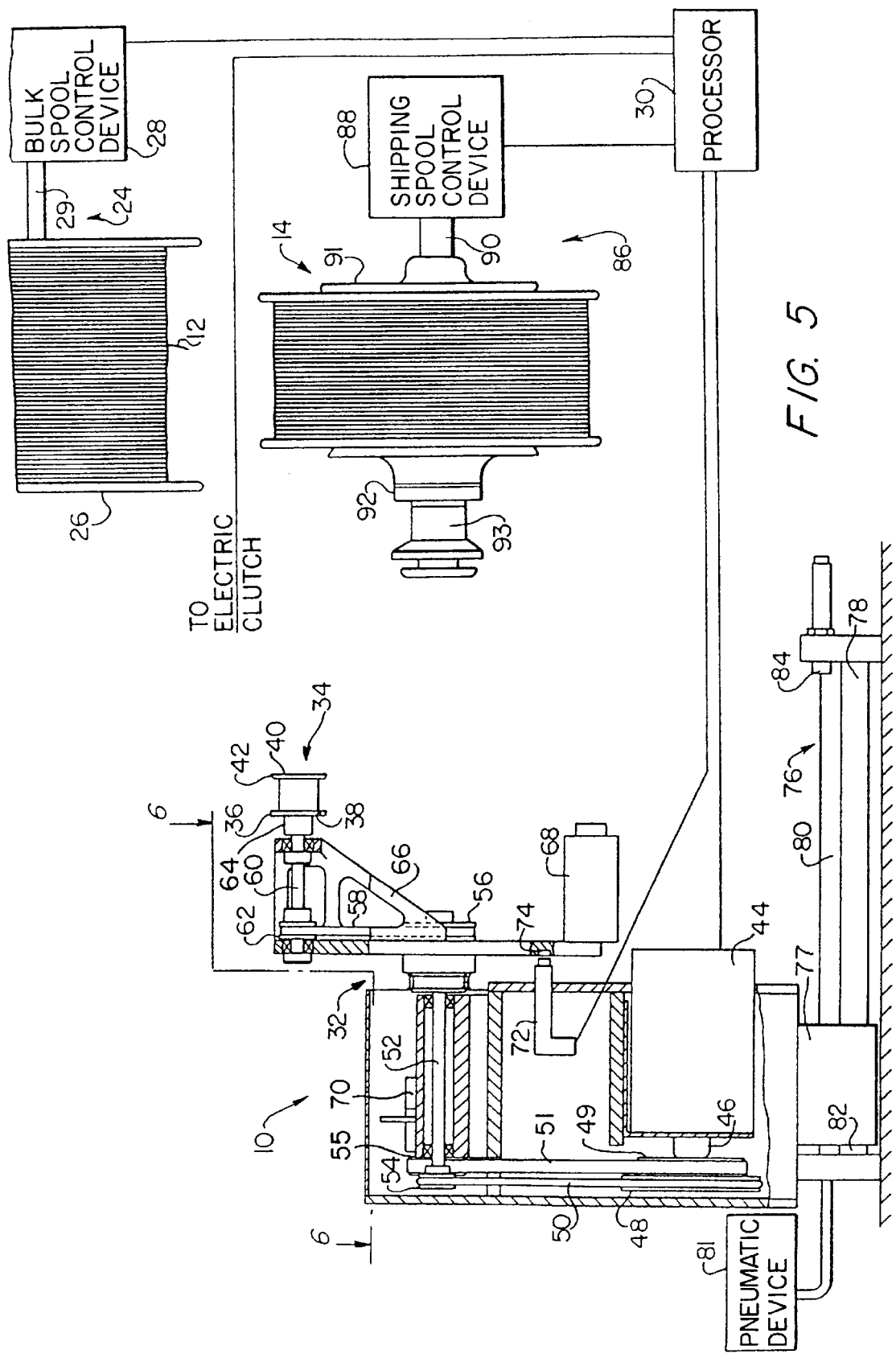
FIG. 5 is a side view of the winding apparatus of FIG. 1, showing the sample section winding device in a retracted position.
Figure 6:
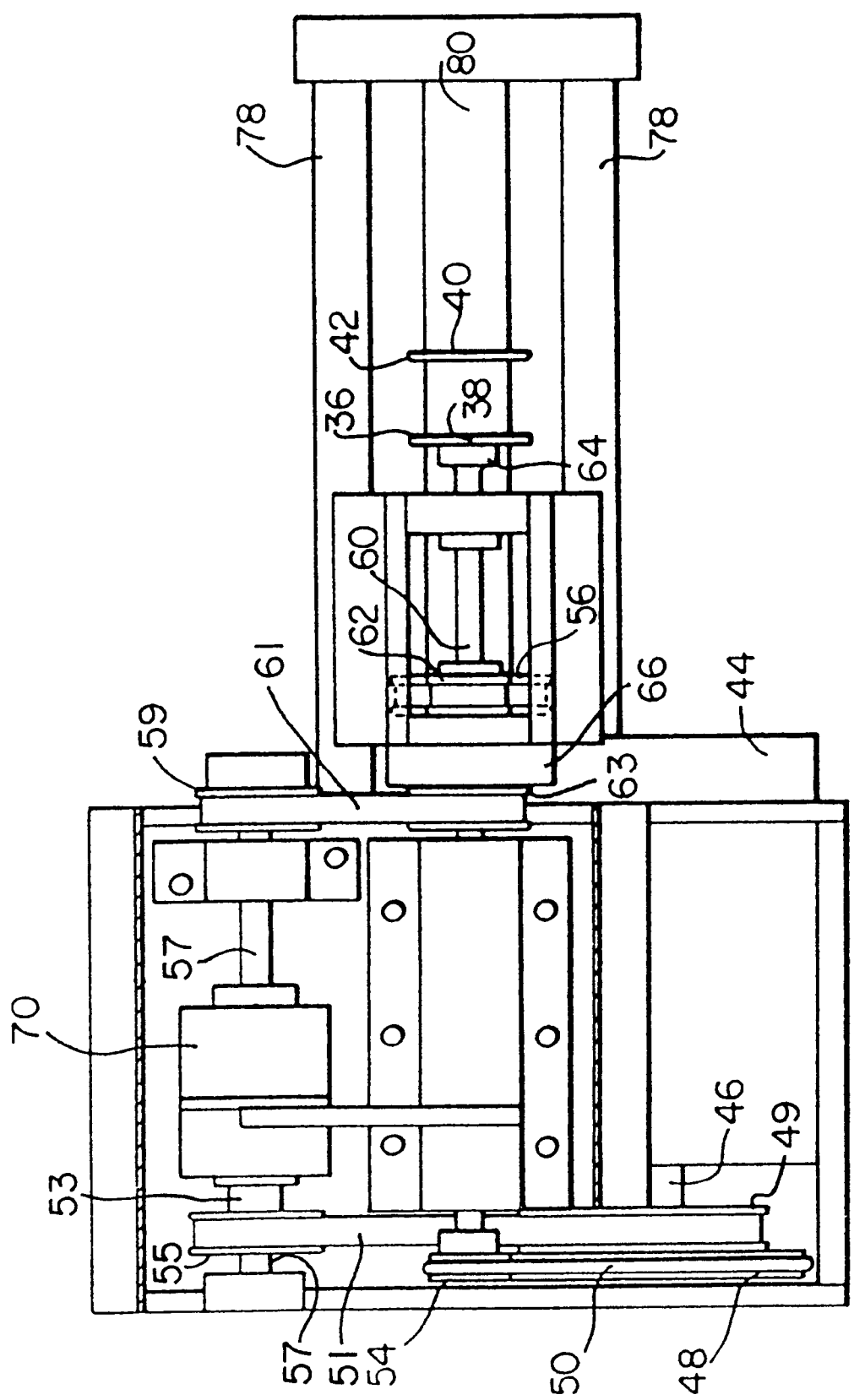
FIG. 6 is a top view of the sample section winding device taken along line 6—6 of FIG. 5.

The winding apparatus 10 also includes a moving mechanism 76 for moving the sample section winding device 32 between a retracted position (FIG. 5) and a winding position (FIG. 1). The moving mechanism 76 includes two guide rails 78 (FIG. 6) and a rod-less cylinder 80, which extend through a base portion 77 of the sample section winding device 32. A movable magnet (not shown) in the rod-less cylinder 80 is magnetically coupled to the base portion 77. A pneumatic device 81 is controlled by the operator to drive the movable magnet to move the sample section winding device 32.

The moving mechanism 76 also includes a first bumper 82 and a second bumper 84. The second bumper 84 contacts the base portion 77 to ensure proper positioning of the sample section winding device 32 relative to the shipping spool 14.

The main section winding device 86 of the winding apparatus 10 preferably includes a shipping spool control device 88, which controls the rotation of the shipping spool 14 about axis MA by controlling the rotation of a shaft 90 upon which the shipping spool 14 is mounted. The processor 30 controls the shipping spool control device 88.

As shown in FIG. 8, the shipping spool 14 is held on the shaft 90 by a fixed bolster plate 91 and a removable bolster plate 92. A conventional quick connect coupling 93 removably connects the bolster plate 92 to the shaft 90. The bolster plate 92 has a recess 94 for receiving a portion of the shipping spool 14 so that a beveled portion 96 can extend partially into the sample section 16 of the shipping spool 14. The beveled portion 96 guides the first portion of the optical fiber into the sample section 16, as will be described later.

The winding apparatus 10 of the present invention operates as follows. While the sample section winding device 32 is in the retracted position (FIG. 5), an operator mounts an empty shipping spool 14 on the shaft 90 and attaches the bolster plate 92 to the shaft 90 to hold the shipping spool 14 in position. The operator then controls the moving mechanism 76 to move the sample section winding device 32 to the winding position (FIG. 1).

The operator threads the free end of a first portion of a continuous length of optical fiber from the fiber supply 24 through the hole 22 (FIG. 8) in the flange 20 of the shipping spool 14. The free end is threaded from the inner side of the flange 20 toward the outer side of the flange 20. The operator inserts the free end into the slit 38 in the elastic portion 36 on the reel 34, as shown in FIG. 1.

Figure 2:
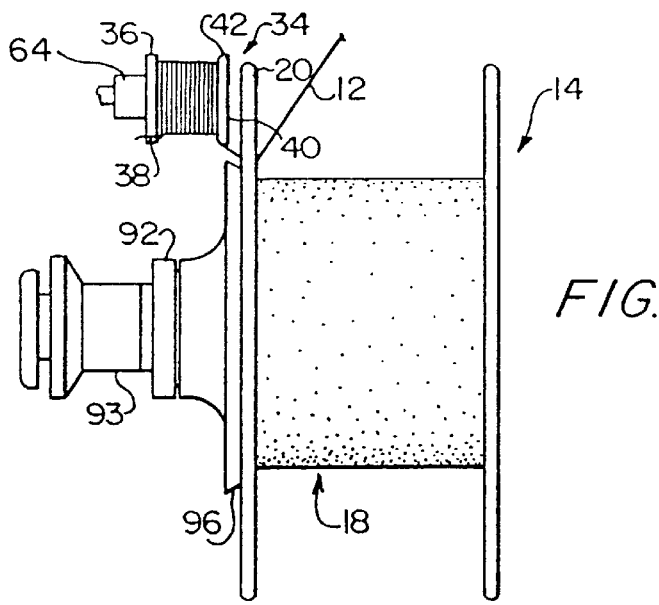
FIG. 2 is a side view of a portion of the winding apparatus of FIG. 1, showing an optical fiber being wound onto a reel of the sample section winding device.

After receiving a signal initiated by the operator, the processor 30 causes the bulk spool control device 28 to rotate the bulk spool 26 to pay out the first portion and simultaneously energizes the motor 44 to drive the reel 34 (the electric clutch 70 is in the disengaged state). As shown in FIG. 2, the first portion being paid out by the bulk spool 26 is collected by the rotating reel 34 in a preliminary winding step. If the torque on the reel shaft 60 would cause more than a desired amount of tension (preferably 20 grams or less) in the optical fiber, the slip clutch 64 slips and allows the reel 34 to rotate more slowly than the reel shaft 60.

After the bulk spool control device 28 determines (based on the number of rotations of the bulk spool 26) that the entire first portion (preferably about ten meters) has been paid out by the bulk spool 26, the processor 30 stops the rotation of the bulk spool 26. Although the motor 44 continues to rotate the reel shaft 60 even after the bulk spool 26 stops paying out the first portion, the slip clutch 64 allows the reel 34 to remain stationary while providing no more than a desired amount of tension in the optical fiber.

Figure 3:
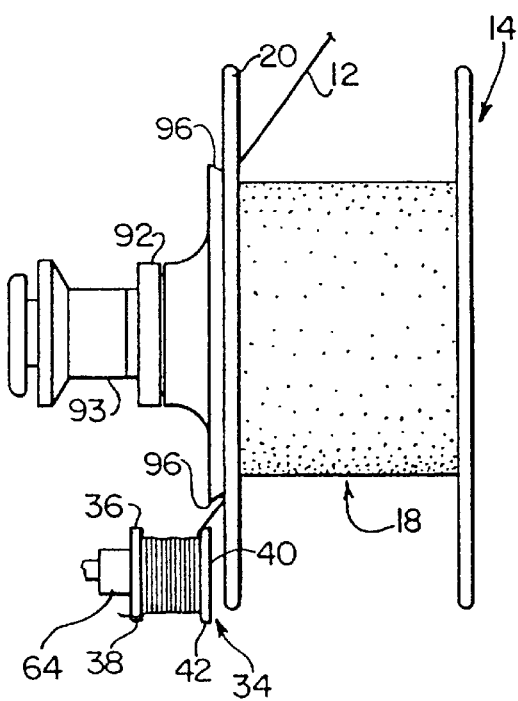
FIG. 3 is a side view of a portion of the winding apparatus of FIG. 1, showing the optical fiber being wound from the reel onto a sample section of a spool.
Figure 4:
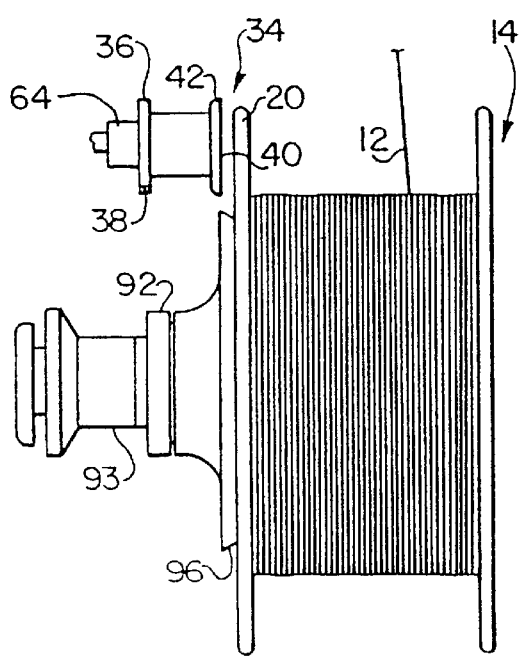
FIG. 4 is a side view of a portion of the winding apparatus of FIG. 1, showing the optical fiber being wound onto a main section of the spool.

The processor 30 then shifts the electric clutch 70 to the engaged state, thereby causing the carriage 66 to rotate and causing the reel 34 to revolve around axis MA of the sample section 16 of the stationary shipping spool 14. FIG. 3 shows that, as the reel 34 revolves, the first portion of the optical fiber contacts the beveled portion 96 of the bolster plate 92, which guides the optical fiber into the sample section 16 (FIG. 7). While the reel 34 is revolving around axis MA, the slip clutch 64 slips to allow the reel 34 to rotate relative to the reel shaft 60 and wind the first portion onto the sample section 16 with a predetermined tension (preferably 20 grams or less) in the optical fiber.

The processor 30 deenergizes the motor 44 to stop rotation of the carriage 66 after the detector 72 has detected a predetermined number of rotations of the carriage 66 (the number of rotations required to wind substantially the entire first portion from the reel 34 onto the sample section 16). The operator then removes the free end of the first portion from the grip of the elastic portion 36 and inserts it into the sample section 16 of the shipping spool 14, where it is readily accessible for testing. The free end can be held in place by a foam wedge (not shown) inserted into the sample section 16.

After receiving a signal initiated by the operator, the processor 30 causes the bulk spool control device 28 to rotate the bulk spool 26 to pay out the second portion of the continuous length of optical fiber and simultaneously causes the shipping spool control device 88 to rotate the shipping spool 14 about axis MA to wind the second portion onto the main section 18 of the shipping spool 14. When the entire second portion has been paid out by the bulk spool 26 (as determined by rotations of a capstan (not shown) over which the optical fiber passes), the processor 30 stops the rotation of the bulk spool 26 and the shipping spool 14. The operator then severs the optical fiber extending between the bulk spool 26 and the shipping spool 14 and attaches the newly-created free end of the second portion to the shipping spool, where it is readily accessible for testing.

As is apparent from the description above, the preferred winding apparatus performs the winding process substantially automatically. In addition, the preferred winding apparatus quickly winds the optical fiber. For example, the preferred apparatus can collect the first portion on the reel 34 in six seconds and can wind the first portion on the sample section 16 in four seconds.

It will be apparent to those skilled in the art that various modifications and variations can be made in the method and apparatus of the present invention without departing from the scope or spirit of the invention. For example, although a preferred embodiment has been described with reference to the winding of an optical fiber on a shipping spool, certain aspects of the invention may be applied to the winding of other fibers on different types of spools.

Other embodiments of invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for winding a continuous length of fiber from a fiber supply onto first and second sections of a spool, the apparatus comprising:

a first device that collects a first portion of the continuous length of fiber from the fiber supply and winds the collected first portion onto the first section of the spool outside the flange; and a second device that winds a second portion of the continuous length of fiber onto the second section of the spool inside the flange.

2. The apparatus of claim 1, wherein the first device includes a reel that rotates to collect the first portion of the continuous length of fiber.

3. The apparatus of claim 2, wherein the first device has a slip clutch that prevents the reel from creating more than a predetermined amount of tension in the first portion while collecting the first portion.

4. The apparatus of claim 2, wherein the first device includes a carriage that rotatably supports the reel and that causes the reel to revolve around an axis of the first section of the spool to wind the first portion of the continuous length of fiber onto the first section of the spool.

5. The apparatus of claim 4, wherein the first device has a slip clutch that prevents the reel from creating more than a predetermined amount of tension in the first portion while winding the first portion onto the first section.

6. The apparatus of claim 4, wherein the second device rotates the spool about said axis to wind the second portion of the continuous length of fiber onto the second section of the spool.

7. The apparatus of claim 1, wherein the second device includes a shaft that supports the spool and rotates the spool to wind the second portion of the continuous length of fiber onto the second section of the spool.

8. The apparatus of claim 7, further comprising a bolster plate that holds the spool on the shaft, wherein the bolster plate has a beveled portion for guiding the first portion from the first device onto the first section.

9. The apparatus of claim 1, further comprising a moving mechanism that moves the first device toward and away from said spool.

10. The apparatus of claim 1, wherein the first and second portions constitute minor and major portions, respectively, of the continuous length of fiber.

11. A method of winding a continuous length of fiber from a fiber supply onto first and second sections of a spool, the method comprising the steps of:
    preliminarily winding a first portion of the continuous length of fiber to collect the first portion from the fiber supply while a second portion of the continuous length of fiber remains at the fiber supply;
    winding the collected first portion onto the first section of the spool while the second portion remains at the fiber supply; and
    winding the second portion of the continuous length of fiber from the fiber supply onto the second section of the spool.

12. The method of claim 11, wherein the step of preliminarily winding the first portion includes winding the first portion onto a reel.

13. The method of claim 12, wherein the step of winding the collected first portion includes causing the reel to revolve around the first section while the spool is stationary.

14. The method of claim 13, wherein the step of winding the second portion includes rotating the spool.

15. The method of claim 11, wherein the first and second portions constitute minor and major portions, respectively, of the continuous length of fiber.

16. An apparatus for winding a first portion of a continuous length of fiber from a fiber supply onto an object, the apparatus comprising:
    a reel that rotates to collect the first portion of the continuous length of fiber while a second portion of the continuous length of fiber remains at the fiber supply; and
    a carriage that rotatably supports the reel and that causes the reel to revolve around the object to wind the collected first portion of the continuous length of fiber onto the object while the second portion remains at the fiber supply.

17. The apparatus of claim 16, further comprising a slip clutch that prevents the reel from creating more than a predetermined amount of tension in the first portion while collecting the first portion.

18. The apparatus of claim 16, further comprising a slip clutch that prevents the reel from creating more than a predetermined amount of tension in the first portion while winding the first portion onto the object.

19. The apparatus of claim 16, further comprising a moving mechanism that moves the reel toward and away from the object.

20. A method of winding a first portion of a continuous length of fiber from a fiber supply onto an object, the method comprising the steps of:
    preliminarily winding a first portion of the continuous length of fiber to collect the first portion from the fiber supply while a second portion of the continuous length of fiber remains at the fiber supply; and
    winding the collected first portion onto the object while the second portion remains at the fiber supply.

21. The method of claim 20, wherein the step of preliminarily winding the first portion includes winding the first portion onto a reel.

22. The method of claim 21, wherein the step of winding the collected first portion includes causing the reel to revolve around the object while the object is stationary.

23. An apparatus for winding a continuous length of fiber from a fiber supply onto first and second section of a spool, the apparatus comprising:
    a first device that collects a first portion of the continuous length of fiber from the fiber supply and winds the collected first portion onto the first section of the spool;
    a second device that winds a second portion of the continuous length of fiber onto the second section of the spool; and
    a moving mechanism that moves the first device toward and away from said spool.

* * * * *